US012647162B2

(12) United States Patent
Wang et al.

(10) Patent No.: US 12,647,162 B2
(45) Date of Patent: Jun. 2, 2026

(54) TECHNIQUES FOR MOBILITY SUPPORT FOR USER EQUIPMENT WITH BACKSCATTERING RADIO

(71) Applicant: QUALCOMM Incorporated, San Diego, CA (US)

(72) Inventors: Xiaojie Wang, Hillsborough, NJ (US); Danlu Zhang, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 762 days.

(21) Appl. No.: 17/932,874

(22) Filed: Sep. 16, 2022

(65) Prior Publication Data

US 2024/0097757 A1     Mar. 21, 2024

(51) Int. Cl.
| | |
|---|---|
| *H04B 7/06* | (2006.01) |
| *H04W 52/02* | (2009.01) |
| *H04W 68/02* | (2009.01) |
| *H04W 72/51* | (2023.01) |
| *H04W 72/542* | (2023.01) |
| *H04W 92/18* | (2009.01) |

(52) U.S. Cl.
CPC .......... *H04B 7/0617* (2013.01); *H04W 72/51* (2023.01); *H04W 72/542* (2023.01)

(58) Field of Classification Search
CPC . H04B 7/0617; H04B 7/06952; H04W 72/51; H04W 72/542; H04W 52/028; H04W 68/025; H04W 92/18
See application file for complete search history.

(56) References Cited

U.S. PATENT DOCUMENTS

| | | | | |
|---|---|---|---|---|
| 11,658,726 B2 * | 5/2023 | Li | ........................ | H04L 5/0023 370/329 |
| 2005/0159187 A1 * | 7/2005 | Mendolia | ............... | H01Q 25/00 343/702 |
| 2006/0001585 A1 * | 1/2006 | Saito | ........................ | G01S 3/46 343/754 |
| 2007/0018794 A1 * | 1/2007 | Bares | .................... | G06F 1/3287 340/10.3 |
| 2008/0076353 A1 * | 3/2008 | Rofougaran | ....... | H04N 21/4367 348/E7.07 |

(Continued)

FOREIGN PATENT DOCUMENTS

| | | |
|---|---|---|
| WO | 2018232090 A1 | 12/2018 |
| WO | 2021042360 | 3/2021 |

OTHER PUBLICATIONS

International Search Report and Written Opinion—PCT/US2023/071127—ISA/EPO—Jan. 29, 2024.

(Continued)

*Primary Examiner* — Jenee Holland
(74) *Attorney, Agent, or Firm* — Harrity & Harrity, LLP

(57) ABSTRACT

Various aspects of the present disclosure generally relate to wireless communication. In some aspects, a user equipment (UE) may transmit, for one or more nodes, capability information regarding a beam tracking capability of a backscattering radio of the UE. The UE may perform beam tracking in accordance with the beam tracking capability. The UE may transmit, for the one or more nodes, beam information based at least in part on the beam tracking. Numerous other aspects are described.

30 Claims, 11 Drawing Sheets

700

710 — Transmit, for one or more nodes, capability information regarding a beam tracking capability of a backscattering radio of the UE 720 — Perform beam tracking in accordance with the beam tracking capability 730 — Transmit, for the one or more nodes, beam information based at least in part on the beam tracking

(56) References Cited

U.S. PATENT DOCUMENTS

| | | | |
|---|---|---|---|
| 2016/0021548 A1* | 1/2016 | Raghavan | H04W 16/28 370/329 |
| 2016/0190686 A1* | 6/2016 | Gao | H04B 7/086 342/374 |
| 2016/0196455 A1* | 7/2016 | Gudan | H04B 7/0617 340/10.5 |
| 2017/0047968 A1* | 2/2017 | Moshfeghi | H04B 7/0617 |
| 2017/0359106 A1* | 12/2017 | John Wilson | H04B 7/0617 |
| 2018/0049126 A1* | 2/2018 | Cheng | H04W 76/28 |
| 2019/0007906 A1* | 1/2019 | Hessler | H04W 72/046 |
| 2019/0105768 A1* | 4/2019 | Greenberg | B65G 47/53 |
| 2019/0150003 A1* | 5/2019 | He | H04W 16/28 342/368 |
| 2019/0222384 A1* | 7/2019 | Wu | H04B 7/0641 |
| 2019/0246364 A1* | 8/2019 | Jung | H04W 52/52 |
| 2019/0393944 A1* | 12/2019 | Huang | H04B 7/0617 |
| 2020/0177266 A1* | 6/2020 | Kang | H04W 74/02 |
| 2020/0383026 A1* | 12/2020 | Peisa | H04B 7/022 |
| 2021/0289583 A1* | 9/2021 | Zhang | H04B 7/0602 |
| 2022/0086754 A1 | 3/2022 | Pezeshki et al. | |
| 2022/0167370 A1* | 5/2022 | Chen | H04W 24/08 |
| 2022/0232474 A1* | 7/2022 | Xu | H04W 52/383 |
| 2022/0381876 A1* | 12/2022 | Ng | H04L 5/0048 |
| 2023/0188194 A1* | 6/2023 | Geren | H04B 7/0695 375/262 |
| 2023/0318690 A1* | 10/2023 | Kurras | H04B 7/06 375/262 |
| 2024/0015661 A1* | 1/2024 | Wang | H04B 7/15528 |
| 2025/0112684 A1* | 4/2025 | Medra | H04B 7/06962 |

OTHER PUBLICATIONS

Partial International Search Report—PCT/US2023/071127—ISA/EPO—Dec. 6, 2023.

* cited by examiner

700

710  Transmit, for one or more nodes, capability information regarding a beam tracking capability of a backscattering radio of the UE 720  Perform beam tracking in accordance with the beam tracking capability 730  Transmit, for the one or more nodes, beam information based at least in part on the beam tracking 810 Obtain motion information based at least in part on one or more sensors of the UE 820 Output, to a backscattering radio of the UE, information indicating one or more beams for the backscattering radio based at least in part on the motion information

800

1000

1010 Obtain, from a UE, capability information regarding a beam tracking capability of a backscattering radio of the UE 1020 Obtain, from the UE, beam information based at least in part on the beam tracking

TECHNIQUES FOR MOBILITY SUPPORT FOR USER EQUIPMENT WITH BACKSCATTERING RADIO

FIELD OF THE DISCLOSURE

Aspects of the present disclosure generally relate to wireless communication and to techniques and apparatuses for mobility support for a user equipment (UE) with a backscattering radio.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

Some aspects described herein relate to a method of wireless communication performed by a user equipment (UE). The method may include transmitting, for one or more nodes, capability information regarding a beam tracking capability of a backscattering radio of the UE. The method may include performing beam tracking in accordance with the beam tracking capability. The method may include transmitting, for the one or more nodes, beam information based at least in part on the beam tracking.

Some aspects described herein relate to a method of wireless communication performed by an apparatus of a UE. The method may include obtaining motion information based at least in part on one or more sensors of the UE. The method may include outputting, to a backscattering radio of the UE, information indicating one or more beams for the backscattering radio based at least in part on the motion information.

Some aspects described herein relate to a UE for wireless communication. The UE may include a memory and one or more processors coupled to the memory. The one or more processors may be configured to transmit, for one or more nodes, capability information regarding a beam tracking capability of a backscattering radio of the UE. The one or more processors may be configured to perform beam tracking in accordance with the beam tracking capability. The one or more processors may be configured to transmit, for the one or more nodes, beam information based at least in part on the beam tracking.

Some aspects described herein relate to an apparatus of a UE for wireless communication. The apparatus may include a memory and one or more processors coupled to the memory. The one or more processors may be configured to obtain motion information based at least in part on one or more sensors of the UE. The one or more processors may be configured to output, to a backscattering radio of the UE, information indicating one or more beams for the backscattering radio based at least in part on the motion information.

Some aspects described herein relate to a non-transitory computer-readable medium that stores a set of instructions for wireless communication by a UE. The set of instructions, when executed by one or more processors of the UE, may cause the UE to transmit, for one or more nodes, capability information regarding a beam tracking capability of a backscattering radio of the UE. The set of instructions, when executed by one or more processors of the UE, may cause the UE to perform beam tracking in accordance with the beam tracking capability. The set of instructions, when executed by one or more processors of the UE, may cause the UE to transmit, for the one or more nodes, beam information based at least in part on the beam tracking.

Some aspects described herein relate to a non-transitory computer-readable medium that stores a set of instructions for wireless communication by a UE. The set of instructions, when executed by one or more processors of the UE, may cause the UE to obtain motion information based at least in part on one or more sensors of the UE. The set of instructions, when executed by one or more processors of the UE, may cause the UE to output, to a backscattering radio of the UE, information indicating one or more beams for the backscattering radio based at least in part on the motion information.

Some aspects described herein relate to an apparatus for wireless communication. The apparatus may include means for transmitting, for one or more nodes, capability information regarding a beam tracking capability of a backscattering radio of the apparatus. The apparatus may include means for performing beam tracking in accordance with the beam tracking capability. The apparatus may include means for transmitting, for the one or more nodes, beam information based at least in part on the beam tracking.

Some aspects described herein relate to an apparatus for wireless communication. The apparatus may include means for obtaining motion information based at least in part on one or more sensors of the apparatus. The apparatus may include means for outputting, to a backscattering radio of the apparatus, information indicating one or more beams for the backscattering radio based at least in part on the motion information.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
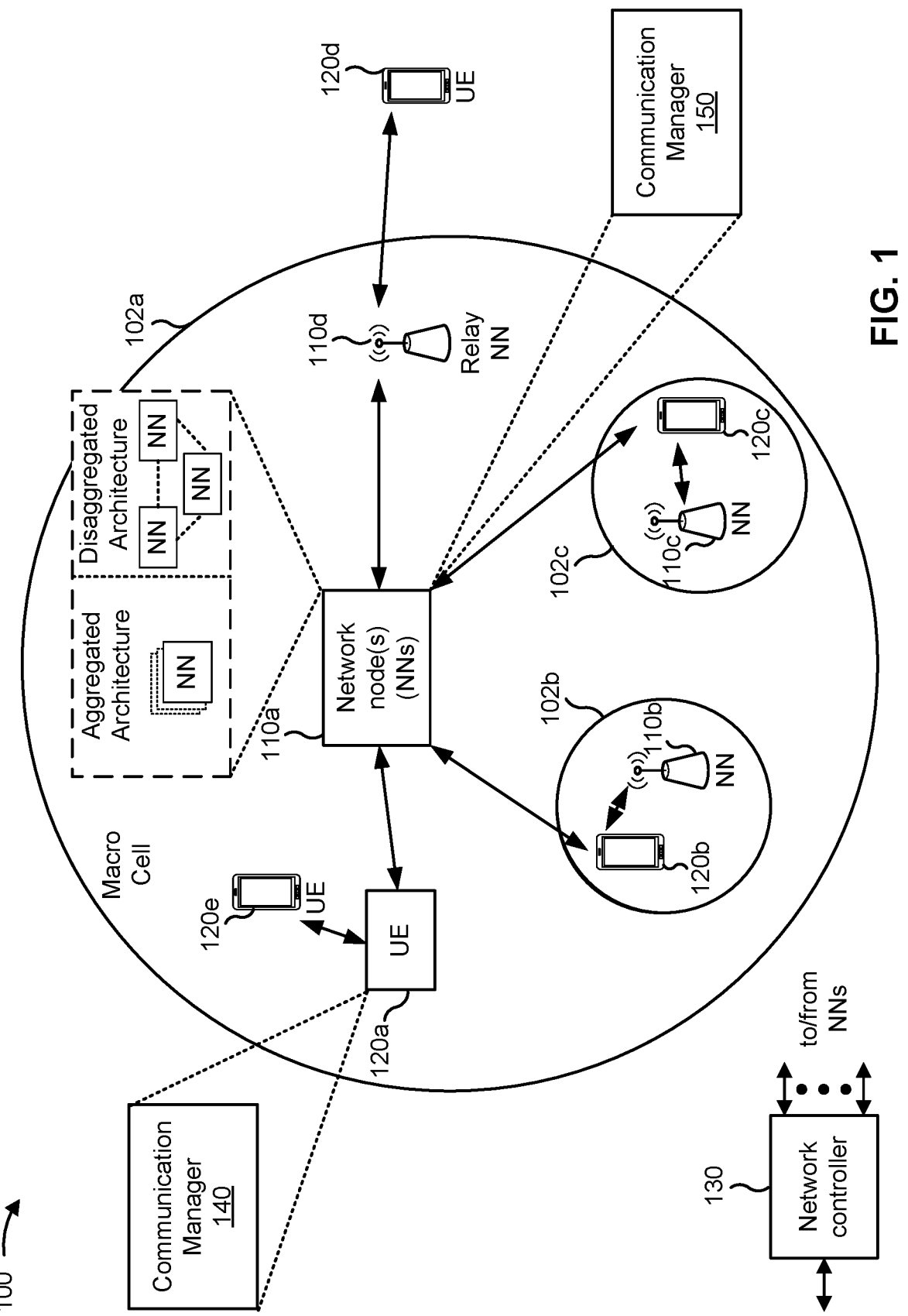
FIG. 1 is a diagram illustrating an example of a wireless network.

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), or other entities. A network node 110 is an example of a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used. A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node"

may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (for example, a network node 110 or a UE 120) and send a transmission of the data to a downstream node (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay base station, a relay network node, a relay node, or a relay, among other examples.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing 284 that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With these examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may transmit, for one or more nodes, capability information regarding a beam tracking capability of a backscattering radio of the UE; perform beam tracking in accordance with the beam tracking capability; and transmit, for the one or more nodes, beam information based at least in part on the beam tracking. In some aspects, the communication manager 140 may obtain motion information based at least in part on one or more sensors of the UE; and output, to a backscattering radio of the UE, information indicating one or more beams for the backscattering radio based at least in part on the motion information. Additionally, or alternatively, the communication manager 140 may perform one or more other operations described herein.

In some aspects, the network node 110 may include a communication manager 150. As described in more detail elsewhere herein, the communication manager 150 may obtain, from a user equipment (UE), capability information regarding a beam tracking capability of a backscattering radio of the UE; and obtain, from the UE, beam information based at least in part on the beam tracking. Additionally, or alternatively, the communication manager 150 may perform one or more other operations described herein.

As indicated above, FIG. 1 is provided as an example. Other examples may differ from what is described with regard to FIG. 1.

Figure 2:
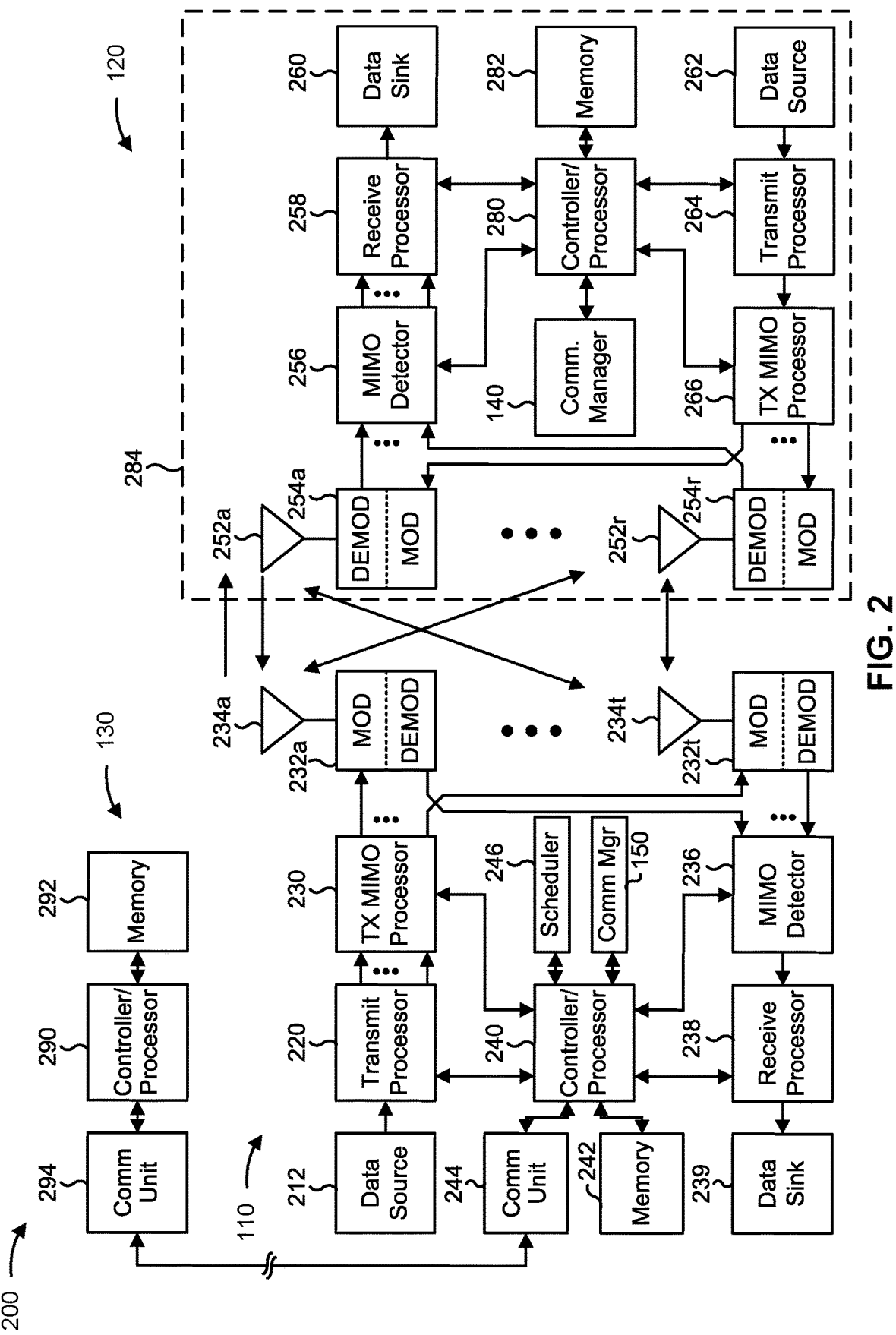
FIG. 2 is a diagram illustrating an example of a network node in communication with a user equipment (UE) in a wireless network.

FIG. 2 is a diagram illustrating an example 200 of a network node 110 in communication with a UE 120 in a wireless network 100. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 using one or more channel quality indicators (CQIs) received from that UE 120. The network node 110 may process (for example, encode and modulate) the data for the UE 120 using the MC S(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein (e.g., with reference to FIGS. 4-11).

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein (e.g., with reference to FIGS. 4-11).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or sub-components of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, or any other component(s) of FIG. 2 may perform one or more techniques associated with beam tracking, as described in more detail elsewhere herein. For example, the controller/processor 240 of the network node 110, the controller/processor 280 of the UE 120, or any other component(s) (or combinations of components) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for transmitting, for one or more nodes, capability information regarding a beam tracking capability of a backscattering radio of the UE; means for performing beam tracking in accordance with the beam tracking capability; and/or means for transmitting, for the one or more nodes, beam information based at least in part on the beam tracking. In some aspects, the UE 120 includes means for obtaining motion information based at least in part on one or more sensors of the UE; and/or means for outputting, to a backscattering radio of the UE, information indicating one or more beams for the backscattering radio based at least in part on the motion information. In some aspects, the means for the UE 120 to perform operations described herein may include, for example, one or more of communication manager 140, antenna 252, modem 254, MIMO detector 256, receive processor 258, transmit processor 264, TX MIMO processor 266, controller/processor 280, memory 282, or one or more components illustrated in FIG. 4.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (for example, within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
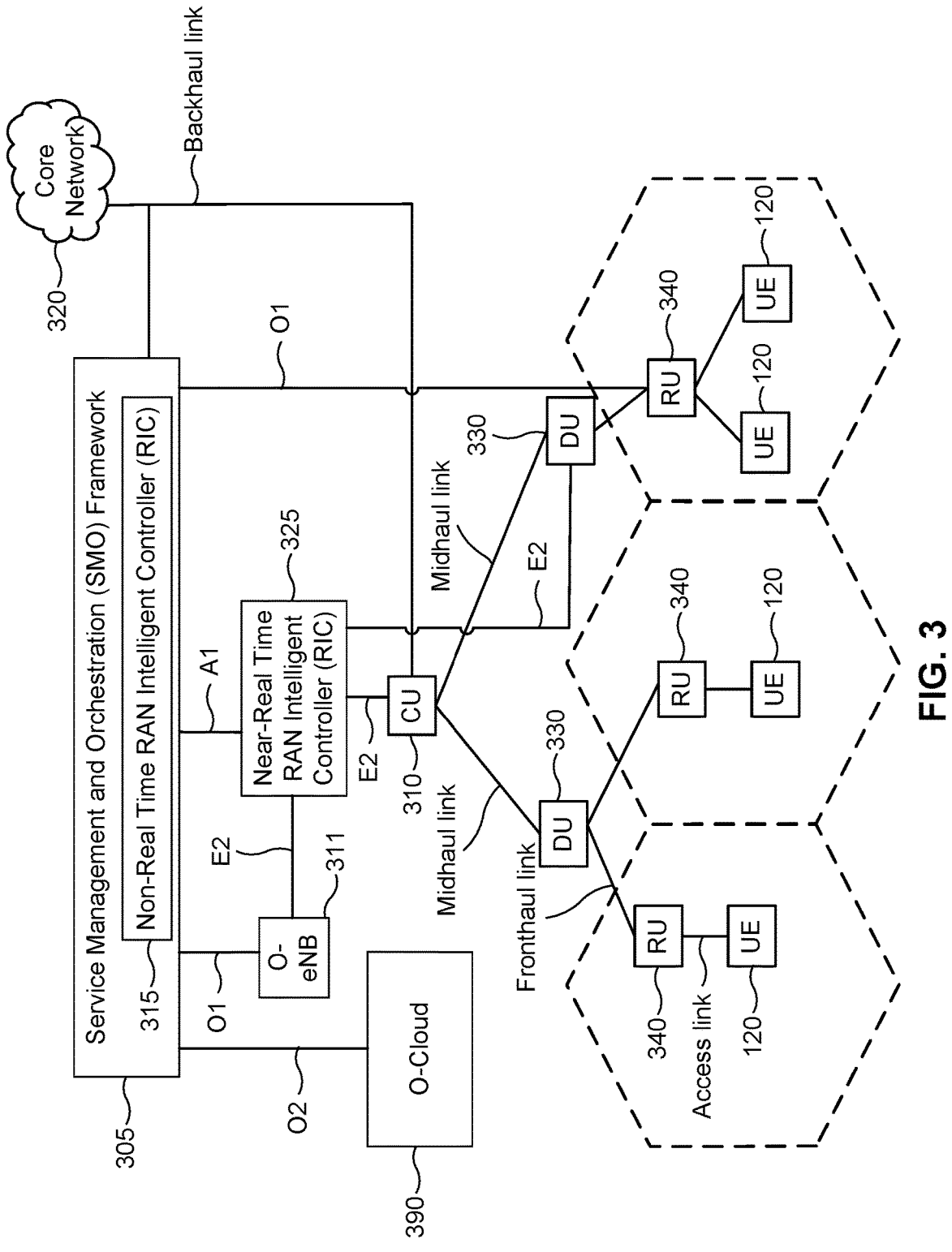
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
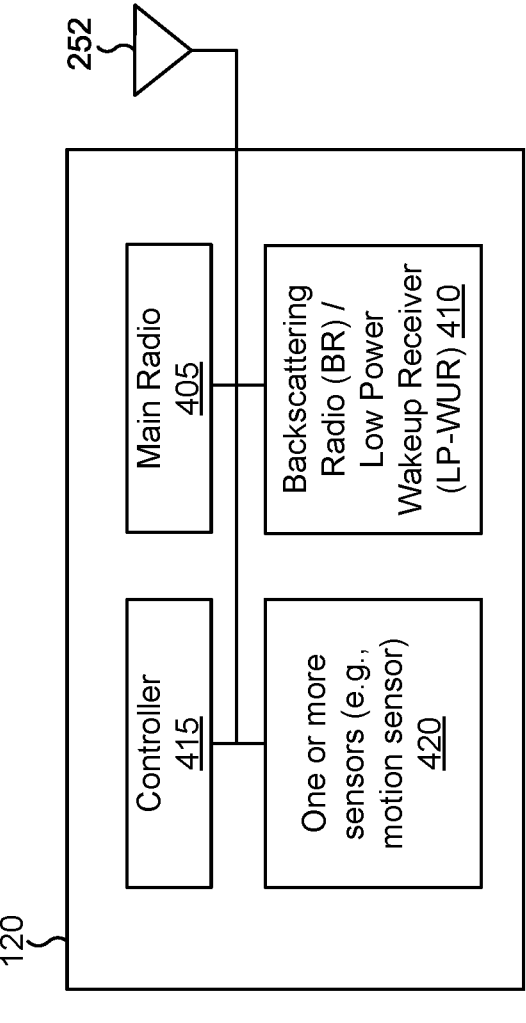
FIG. 4 is a diagram illustrating an example of a UE comprising a main radio, a backscattering radio, a controller, and one or more sensors.

FIG. 4 is a diagram illustrating an example 400 of a UE (e.g., UE 120) comprising a main radio 405, a backscattering radio 410, a controller 415, and one or more sensors 420. The main radio 405 may be used for data and control communications of the UE. The main radio 405 may include one or more active radio frequency (RF) components, such as a power amplifier (PA) (for transmission) or a low-noise amplifier (for reception). The main radio 405 may generate signals at a higher power than a backscattering radio 410, such as at, for example, 23 dBm. The backscattering radio 410 may comprise a receiver associated with receiving wakeup signaling from a network, such as a low power wakeup receiver (LP-WUR). The backscattering radio 410 may use a backscattering function to transmit data, and may receive data from the network. In some aspects, the backscattering radio 410 may use passive components for reception and for transmission. In some aspects, the backscattering radio 410 may be used for low data rate communication (thereby providing lower latency than waking up the main radio 405 for a low data rate communication).

In some aspects, the backscattering radio 410 may comprise a radio frequency identifier (RFID) transponder, sometimes referred to as an RFID tag. For example, RFID tags may be used in many applications for inventory and asset management in warehouse operations, IoT, sustainable sensor networks in factories and/or agriculture, and smart home applications. An RFID tag may emit an information-bearing signal upon receiving a signal, such as by backscatter modulating a transmitted signal. An RFID tag can be operated without a battery at low operating expense, low maintenance cost, and a long lifespan. A passive RFID tag may harvest energy from over-the-air transmission, and may use the harvested energy to power transmission and reception circuitry. In some aspects, an RFID tag may be semi-passive or active, meaning that the RFID tag includes a battery that can power operations of the RFID tag without performing energy harvesting.

In some aspects, the UE 120, or the backscattering radio 410, may be considered a passive IoT device. A radio access technology (e.g., 5G/NR, 6G, or the like) may provide for management of passive IoT devices. For example, a network node (e.g., a gNB) may read or write information stored on a passive IoT device. As another example, a network node may provide energy to a passive IoT device (e.g., for energy harvesting). As yet another example, an information-bearing signal may be reflected to a network node, and the network node may read the reflected signal to decode the information encoded onto the signal by the passive IoT device.

As mentioned above, in some aspects, the backscattering radio may comprise an LP-WUR. An LP-WUR is a receiver that may monitor for a wakeup signal while the main radio 405 is in a deep sleep state. The LP-WUR may be designed for low power usage, such as using low-power components and being powered separately from the main radio 405. The backscattering radio 410 (e.g., the LP-WUR) may trigger the main radio 405 to wake up when data communication is needed. For example, the backscattering radio 410 may monitor for paging information relating to the UE 120, and may wake up the main radio 405 when data transmission or reception is needed (such as based at least in part on receiving paging directed to the UE 120). Waking up the main radio 405 may be associated with a fixed latency (e.g., a fixed transition time).

In some aspects, the backscattering radio 410 may include a transceiver. For example, the transceiver may perform envelope-detection-based reception, such that no low noise amplifier (LNA) or power amplifier (PA) is needed. As another example, the transceiver may perform load-modulation-based transmission, such as by absorbing or reflecting incoming electromagnetic waves. In some aspects, the backscattering radio 410 may include an integrated circuit (or another form of processor) for processing uplink and downlink data (such as reading memory, computing a cyclic redundancy check (CRC), waking up the main radio 405, or the like). In some aspects, the backscattering radio 410 may incorporate an energy harvesting component such that the backscattering radio 410 can harvest energy and charge a battery of the backscattering radio 410 in idle mode.

As used herein, "energy harvesting" may refer to obtaining energy from an environment of the backscattering radio 410. One example is RF energy harvesting, in which an RF signal with certain frequency characteristics is converted into direct current (DC) power for the backscattering radio 410. Another example is solar energy harvesting, in which photovoltaic energy is converted into DC power for the backscattering radio.

In some situations, the UE 120 may power down the main radio 405, and may communicate using the backscattering radio 410 while the main radio is powered down, thereby saving power. In some examples (such as in higher bands, for example, in FR2), a backscattering radio 410 may need to maintain an adequate beam for transmission and reception of communications while the UE 120 is in motion or rotation (referred to herein as "mobility"). For example, a handheld device in a power saving mode, a smartphone, a watch, or an IoT device may move from one location to another and/or may experience rotation such that a beam used for communication by the backscattering radio 410 (referred to as a serving beam) needs to be updated from time to time. However, some techniques for maintaining a serving beam, such as periodic measurement of a reference signal transmitted by a network node, may involve some amount of power consumption and overhead at the backscattering radio 410. Furthermore, if the UE 120's position or orientation changes drastically, power consumption, overhead, and latency associated with sweeping beam measurements to identify a new serving beam may be significant.

Some techniques described herein provide indication of one or more beams of a backscattering radio 410 based at least in part on motion information obtained from one or more sensors 420. A controller 415 may obtain motion information from the one or more sensors 420. The controller 415 may output information indicating one or more beams for the backscattering radio 410 based at least in part on the motion information. Thus, an adequate serving beam may be maintained at the backscattering radio 410 based on the output information, which improves communication performance of the backscattering radio 410 relative to a situation where the backscattering radio 410's serving beam is maintained without reference to one or more sensors 420 of the UE. Furthermore, power consumption, overhead, and latency that would otherwise be incurred by maintaining a serving beam using only beam measurements are reduced or avoided by using motion information as a basis for maintaining the serving beam. In some examples (described with regard to FIG. 6), techniques described herein provide signaling of information relating to the beam management of the backscattering radio 410.

The controller 415 may use the motion information to identify one or more beams for the backscattering radio 410. For example, the one or more beams may include a predicted beam (e.g., a transmit beam or a receive beam) that may be suitable for the backscattering radio 410 in view of an updated position or orientation of the UE 120 (determined according to the motion information). As a simple example, if the motion information indicates that the UE 120 has rotated 90 degrees, the controller 415 may identify a predicted beam that is displaced 90 degrees from a prior serving beam of the backscattering radio 410.

For example, the one or more sensors 420 may include an accelerometer, a gyroscope, an inertial sensor, a Global Position System (GPS) unit, or another sensor capable of providing information regarding mobility of the UE 120. The controller 415 may include one or more processors, such as a microcontroller.

The backscattering radio 410 may have a beam steering capability, such as a capability for updating a serving beam of the backscattering radio 410 and/or a capability for forming a beam for reflection of a signal. Different backscattering radios 410 may have different beam steering capabilities. As a first example (referred to as "Case 1"), a backscattering radio 410 may reflect a signal in all directions (e.g., omnidirectionally, without performing beamforming). In Case 1, the backscattering radio 410 may have a single antenna. As a second example (referred to as "Case 2"), the backscattering radio 410 may reflect a signal in one or more fixed directions, such as a retrodirective direction. For example, the backscattering radio 410 may have an antenna array. As a third example (referred to as "Case 3"), the backscattering radio 410 may support beamforming for both transmission (using a transmit beam) and reception (using a receive beam). Examples of signaling associated with Case 1, Case 2, and Case 3 are described with regard to FIG. 6.

As indicated above, FIG. 4 is provided as an example. Other examples may differ from what is described with regard to FIG. 4.

Figure 5:
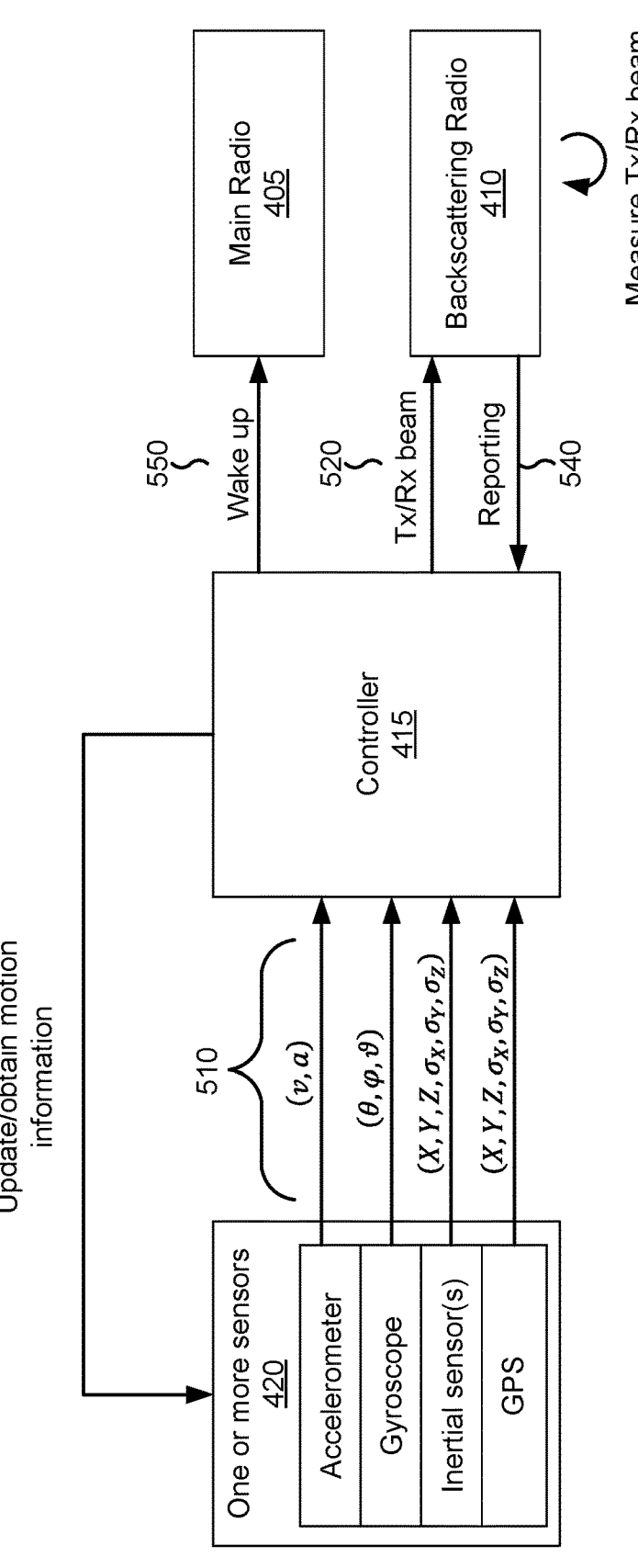
FIG. 5 is a diagram illustrating an example of obtaining motion information, in accordance with the present disclosure.

FIG. 5 is a diagram illustrating an example 500 of obtaining motion information, in accordance with the present disclosure. As shown, a controller 415 of a UE 120 may obtain sensor data 510 from one or more sensors 420 of the UE 120. In some aspects, the one or more sensors 420 may provide the sensor data 510 based at least in part on a configuration from the controller 415. For example, the controller 415 may configure the one or more sensors 420 to provide the sensor data 510 with a periodicity. The one or more sensors 420 may provide the sensor data 510 according to the periodicity, which is referred to herein as the controller 415 obtaining the sensor data 510. In some aspects, the controller 415 may obtain the sensor data 510 on demand, such as by reading the sensor data 510, transmitting a polling message to obtain the sensor data 510, or requesting the sensor data 510 from the one or more sensors 420. The sensor data 510 may include, for example, information indicating a velocity (v), an acceleration (a), a rotation ($\theta$, $\varphi$, $\vartheta$), a lateral movement (X, Y, Z), a rotational movement ($\sigma_X$, $\sigma_Y$, $\sigma_Z$), or the like. In some aspects, the sensor data 510 may relate to six degrees of freedom (DOF) of the UE 120, such as three degrees of lateral movement and three degrees of rotational movement.

The controller 415 may identify a serving beam for the UE 120 (e.g., a backscattering radio 410 of the UE 120) based at least in part on motion information. In some aspects, the sensor data 510 may be the motion information. In some aspects, the controller 415 may determine the motion information based at least in part on the sensor data 510. For example, the controller 415 may use the sensor data 510 to derive a speed or acceleration of the UE 120, where the motion information includes the speed or the acceleration.

As shown by reference number 520, the controller 415 may output (e.g., to the backscattering radio 410) information indicating a serving beam (e.g., a transmit beam and/or a receive beam) based at least in part on the motion information. For example, the serving beam may be a predicted serving beam based at least in part on the UE 120's motion information and a capability of the UE 120 (e.g., Case 1, Case 2, or Case 3, described in connection with FIG. 4).

For Case 1, the controller 415 may provide (e.g., to the backscattering radio 410) information indicating a preferred beam (e.g., a receive beam) for receiving energy from an energy transmitter (ET), such as a network node or another UE. Additionally, or alternatively, the controller 415 may provide a mobility profile for the UE 120, such that the backscattering radio 410 can report the mobility profile to the ET for transmit beam management at the ET. The mobility profile may indicate a mobility state of the UE 120

(e.g., a lateral speed, a lateral direction, a rotation speed, a rotation direction, an acceleration, or a combination thereof). Additionally, or alternatively, the controller 415 may provide information indicating a sequence of transmit beams, such as a sequence of transmit beams for a configured time duration for transmission to the backscattering radio 410 by the ET. In this example, the sequence of transmit beams may be based at least in part on the motion information. For example, the sequence of beams may include one or more beams that are directed to a predicted position of the UE 120 according to the motion information.

For Case 2, the controller 415 may provide, to the backscattering radio 410, a mobility profile for the UE 120, such that the backscattering radio 410 can report the mobility profile to the ET for transmit beam management at the ET. The mobility profile may indicate a mobility state of the UE 120 (e.g., a lateral speed, a lateral direction, a rotation speed, a rotation direction, or a combination thereof). Additionally, or alternatively, the controller 415 may provide information indicating a sequence of transmit beams, such as a sequence of transmit beams for a configured time duration for transmission to the backscattering radio 410 by the ET. In this example, the sequence of transmit beams may be based at least in part on the motion information. For example, the sequence of beams may include one or more beams that are directed to a predicted position of the UE 120 according to the motion information. Additionally, or alternatively, the controller 415 may provide information indicating a sequence of receive beams, such as a sequence of receive beams for a configured time duration for reception at the backscattering radio 410. In this example, the sequence of receive beams may be based at least in part on the capability of the UE 120. For example, the sequence of receive beams may include only beams that are compatible with the one or more fixed directions in which the UE 120 is capable of generating a beam in Case 2.

For Case 3, the controller 415 may provide, to the backscattering radio 410, a mobility profile for the UE 120, such that the backscattering radio 410 can report the mobility profile to the ET for transmit beam management at the ET or can perform receive beam management based at least in part on the mobility profile. The mobility profile may indicate a mobility state of the UE 120 (e.g., a lateral speed, a lateral direction, a rotation speed, a rotation direction, or a combination thereof). Additionally, or alternatively, the controller 415 may provide information indicating a sequence of receive beams, such as a sequence of receive beams for a configured time duration for reception at the backscattering radio 410.

As shown by reference number 530, in some aspects, the backscattering radio 410 may measure a beam. For example, the backscattering radio 410 may measure a predicted beam as provided by the controller 415 at reference number 520. As another example, the backscattering radio 410 may measure a beam determined by the backscattering radio 410 (e.g., prior to receiving information indicating the predicted beam). In some aspects, the backscattering radio 410 may perform a Layer 1 measurement on the beam, such as a reference signal received power (RSRP) measurement, a reference signal received quality (RSRQ) measurement, or a signal-to-interference-plus-noise ratio (SINR) measurement on a reference signal or other transmission on the beam. In some aspects, the backscattering radio 410 may perform such measurements each time a beam is updated (e.g., each time the backscattering radio 410 receives information indicating a serving beam of the backscattering radio 410).

As shown by reference number 540, in some aspects, the backscattering radio 410 may report information to the controller 415 based at least in part on measuring the beam. For example, the information may include measurement information regarding the beam (e.g., an RSRP value, an RSRQ value, an SINR value, or the like). In some aspects, the information may be referred to as feedback. In some aspects, the controller 415 may configure the obtaining of the motion information based at least in part on the information shown by reference number 540. For example, the controller 415 may shorten a periodicity associated with obtaining the motion information if the measurement information fails to satisfy a threshold (e.g., if the beam is sufficiently weak). As another example, the controller 415 may lengthen a periodicity associated with obtaining the motion information if the measurement information satisfies a threshold (e.g., if the beam is sufficiently strong). As another example, the controller 415 may obtain motion information on demand if the measurement information fails to satisfy a threshold (e.g., if the beam is sufficiently weak) such that the controller 415 can identify an updated beam.

In some aspects, the reported information may relate to a single beam, such as a single beam for transmission and reception associated with a single node (e.g., a mono-static scenario). In some aspects, the reported information may indicate a first beam and a second beam. For example, for a backscattering radio 410 receiving a signal from a first node using a receive beam and reflecting the signal to a second node using a transmit beam (e.g., a bi-static scenario), the reported information may indicate the first beam and the second beam. The reported information may indicate a beam using a beam index associated with the beam or using a set of beamforming weights that define the beam, among other examples.

In some aspects, the backscattering radio 410 may perform beam training. "Beam training" refers to adjusting one or more parameters of a beam (or selecting an updated beam) based at least in part on beam measurements or on feedback from another device. For example, the backscattering radio 410 may measure two or more beams, or may perform one or more measurements on a serving beam. As another example, the backscattering radio 410 may receive feedback (e.g., a measurement report) from a receiver of a signal transmitted using the beam. The backscattering radio 410 may select a beam (e.g., an optimal beam) according to the beam measurements or feedback. For example, the backscattering radio 410 may select a beam associated with a highest RSRP value, a highest RSRQ value, or a highest SINR value. As another example, the backscattering radio 410 may select a beam based at least in part on an instruction from a network node to use a particular beam or switch to a particular beam. In some aspects, the backscattering radio 410 may select a single updated beam for mono-static communication (e.g., when the one or more nodes include only a single node). In some aspects, the backscattering radio 410 may select an updated transmit beam and an updated receive beam for bi-static communication (e.g., when the one or more nodes include a first node and the second node). In some aspects, the backscattering radio 410 may report the updated beam to the controller 415.

As used herein, "beam tracking" refers to monitoring and/or selecting a serving beam (e.g., a best or preferred beam to transmit or receive communications) of a backscattering radio of a UE based at least in part on sensor data at the UE, where the sensor data is obtained from one or more sensors 420. In some aspects, beam tracking may include obtaining the sensor data. In some aspects, beam tracking may include performing beam measurements on the serving beam and/or one or more other beams and/or updating a beam based at least in part on the beam measurements (e.g., beam refinement). "Beam tracking" may be referred to as autonomous beam tracking.

As shown by reference number 550, in some aspects, the controller 415 (or the backscattering radio 410, directly or via the controller 415) may trigger the main radio 405 to wake up from a sleep state (e.g., a powered down state, a deep sleep state). For example, the controller 415 or the backscattering radio 410 may trigger the main radio 405 to enter an active state (e.g., a powered-up state). In some aspects, the controller 415 or the backscattering radio 410 may trigger the main radio 405 to wake up based at least in part on sensor data 510. For example, if the sensor data 510 indicates that a motion state of the UE 120 exceeds a capability of the backscattering radio 410 (e.g., a capability indicating a maximum motion state in which the backscattering radio 410 can perform beam management), then the controller 415 may trigger the main radio 405 to wake up from the sleep state. In some aspects, the controller 415 or the backscattering radio 410 may trigger the main radio 405 to wake up based at least in part on beam training at the backscattering radio 410. For example, the controller 415 may trigger the main radio 405 to wake up if a beam measurement fails to satisfy a threshold, if a serving beam of the backscattering radio 410 experiences beam failure, or the like.

As indicated above, FIG. 5 is provided as an example. Other examples may differ from what is described with regard to FIG. 5.

Figure 6:
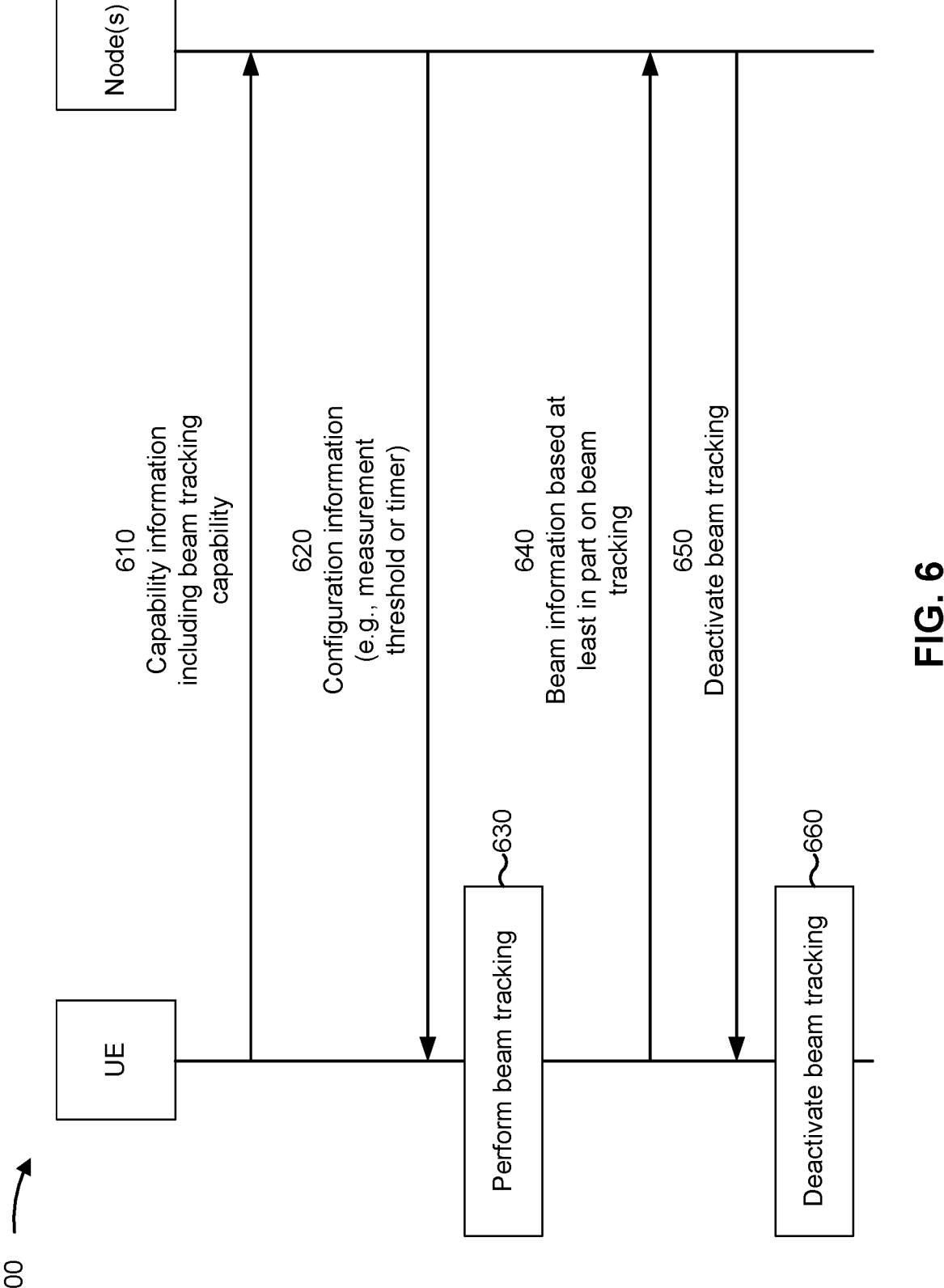
FIG. 6 is a diagram illustrating an example of signaling for mobility for a backscattering radio, in accordance with the present disclosure.

FIG. 6 is a diagram illustrating an example 600 of signaling for mobility for a backscattering radio, in accordance with the present disclosure.

Example 600 includes a UE (e.g., UE 120) and one or more nodes (e.g., network node 110 or UE 120). The UE 120 may include one or more components of FIG. 4, such as a main radio 405, a backscattering radio 410, a controller 415, and/or one or more sensors 420. In some aspects, the one or more network nodes may include a single node (e.g., a mono-static scenario). In some aspects, the one or more nodes may include a first node (e.g., a transmitting node) and a second node (e.g., a receiving network node). Operations described in FIG. 6 as being performed by the UE 120 may be performed by one or more components of the UE 120.

Example 600 relates to beam tracking (e.g., autonomous beam tracking) of a UE, such as described with regard to FIG. 5. The UE may perform beam tracking in accordance with motion information at the UE, such as motion information determined using sensor data of the UE. A beam at the UE (such as a transmit beam or a receive beam) may belong to a beam pair, where a second beam of the beam pair is at a node of the one or more nodes. For example, a beam pair may include a receive beam at the UE and a transmit beam at the node, or may include a transmit beam at the UE and a receive beam at the node. If a UE autonomously selects a serving beam (such as based at least in part on the motion information determined at the UE), then a node may not have access to information regarding which beam is selected by the UE. In such cases, the node may continue to use an inadequate beam (which has been rendered inadequate by motion of the UE), or may select an unsuitable beam for a beam pair between the node and the UE, which decreases throughput and coverage. Some techniques described herein provide signaling between a backscattering radio of the UE and one or more nodes to support beam tracking at the UE. For example, the UE may report beam information relating to the beam tracking, such as indicating a selected beam, a preferred beam, a measurement value at the UE, or the like. A node (e.g., the one or more nodes) may use the beam information for communication with the UE. For example, the node may communicate using a beam indicated by the beam information, may select a beam that provides a threshold performance as a beam pair with a beam selected at the UE, or the like. Thus, throughput and coverage are improved.

As shown by reference number 610, the UE may transmit capability information to one or more nodes. The capability information may relate to (e.g., include) a beam tracking capability of a backscattering radio of the UE. For example, the beam tracking capability may indicate whether the backscattering radio supports beam tracking, using the backscattering radio, while a main radio of the UE is deactivated. As another example, the beam tracking capability may indicate whether the UE (e.g., the controller 415 of the UE) is capable of autonomously tracking a beam using a sensor (e.g., one or more sensors 420) of the UE while a main radio of the UE is deactivated. As yet another example, the beam tracking capability may indicate whether the UE supports beam management (e.g., beam measurements, signaling of a preferred beam, signaling of a beam selected by the controller 415, beam failure detection, and/or beam failure recovery) with the one or more nodes using the backscattering radio.

In some aspects, the capability information may be transmitted while a main radio of the UE is an active state. For example, the UE may transmit the capability information (using the main radio or the backscattering radio) prior to deactivating the main radio. In some aspects, the UE may transmit the capability information via a sidelink, such as a direct communication with another UE, or a broadcast or multicast communication to a group of UEs. In some aspects, the UE may transmit the capability information via a radio access link, such as a Uu link with a network node.

In some aspects, the capability information may indicate a threshold associated with a motion state of the UE. For example, the capability information may indicate a velocity threshold, a speed threshold, an acceleration threshold, or the like. The threshold may be associated with triggering a beam training procedure. For example, if the motion state of the UE (e.g., a velocity, a speed, an acceleration) satisfies the threshold, then the UE or a node may trigger a beam training procedure. If the motion state of the UE does not satisfy the threshold, then the UE may perform autonomous beam tracking, as described with regard to FIG. 5. For example, the UE may select a beam for the backscattering radio using motion information while the motion state of the UE does not satisfy the threshold, and may trigger (or receive a trigger for) a beam training procedure if the motion state satisfies the threshold. In some aspects, the one or more nodes may trigger the beam training procedure based at least in part on the threshold. For example, a node may determine that a motion state of the UE satisfies the threshold, and may output (e.g., transmit to the UE, provide for transmission to the UE) a trigger for the beam training procedure based at least in part on the motion state of the UE satisfying the threshold.

In some aspects, the capability information may indicate a beam steering capability of the backscattering radio. For example, the capability information may indicate whether the UE supports Case 1, Case 2, or Case 3, described in connection with FIG. 4. Thus, the capability information may indicate whether the backscattering radio supports reflection in all directions (e.g., without beamforming), one or more fixed directions, or a configurable direction. The network node may perform mono-static or bi-static backscatter communication with the backscattering radio (by transmitting a signal to the backscattering radio for backscattering to one or more receivers) based at least in part on the capability information indicating whether the UE supports Case 1, Case 2, or Case 3. For example, the network node may inform one or more receivers (e.g., nodes or UEs) near the backscattering radio to receive and decode the backscattered signal, if the backscattering radio backscatters a signal in all directions. If the backscattering radio only backscatters in a certain direction, then the network node may coordinate a receiver in the certain direction to receive a backscattered signal. If the backscattering radio supports beamforming, the network node may transmit an indication for the UE (e.g., the backscattering radio) to beamform a backscattered signal toward a selected receiver.

As shown by reference number 620, the one or more nodes may output, and the UE may receive, configuration information. In some aspects, the configuration information may indicate a threshold for the beam tracking. For example, a node may configure a measurement threshold (e.g., an RSRP threshold, an RSSI threshold, or the like) for declaring beam failure of a beam at the backscattering radio. The backscattering radio may perform beam measurements on a serving beam of the backscattering radio. If the serving beam fails to satisfy the measurement threshold (e.g., if a measurement associated with the serving beam is below the configured measurement threshold), then the UE may declare beam tracking failure. For example, the UE may transmit an indication that the serving beam fails to satisfy the measurement threshold. In some aspects, the UE may wake up a main radio of the UE when the serving beam fails to satisfy the measurement threshold. For example, the UE may wake up the main radio by powering up one or more active components of the main radio (e.g., a digital/analog converter, an analog/digital converter, a PA, an LNA) and/or by commencing usage of the main radio for data or control communication. In some aspects, the UE may wake up the main radio based at least in part on sensor data (e.g., the sensor data 510) being insufficient to support mobility with the backscattering radio. For example, the UE (or the one or more nodes) may wake up the main radio if a motion state of the UE exceeds a configured threshold, as described elsewhere herein. In some aspects, the UE may initiate a beam failure recovery procedure when the serving beam fails to satisfy the measurement threshold. For example, the UE may perform a random access channel (RACH) procedure on a candidate beam selected by the UE.

In some aspects, the configuration information may indicate a timer associated with the measurement threshold. For example, the UE may start the timer upon determining that the serving beam fails to satisfy the measurement threshold (e.g., indicating that beam pairing between the UE and the one or more nodes is unsuccessful). The UE may run the timer (e.g., may not pause, cancel, or reset the timer) while the backscattering radio of the UE cannot find a beam that satisfies the measurement threshold, and while the UE has not received feedback from the one or more nodes. The feedback may include, for example, an acknowledgment or negative acknowledgment (ACK/NACK) from the one or more node or an indication of an expected packet reception from the one or more nodes. If the timer expires without the backscattering radio of the UE finding a beam that satisfies the measurement threshold and without having received feedback, the UE may trigger activation of the main radio of the UE.

As shown by reference number 630, the UE may perform autonomous beam tracking. For example, the UE may use motion information based at least in part on sensor data of the UE to select serving beams for a backscattering radio of the UE, as described with regard to FIG. 5. As another example, the backscattering radio may perform beam measurements on a serving beam of the backscattering radio and/or one or more other beams, such that the backscattering radio can select a preferred beam (e.g., for communication with an ET or the like).

As shown by reference number 640, the UE (e.g., the backscattering radio) may transmit beam information, to the one or more nodes, based at least in part on the beam tracking. For example, the beam information may indicate a preferred beam for communication with an ET. In some aspects, the preferred beam may be a transmit beam at the ET. For example, the UE may identify the preferred beam based at least in part on beam measurements (e.g., RSRP measurements, RSSI measurements, or the like) during the autonomous beam tracking, and may transmit beam information identifying the preferred beam so that the ET can transmit to the UE using the preferred beam. In some aspects, the beam information may be independent of the beam steering capability of the UE. For example, the UE may transmit beam information identifying a preferred beam irrespective of a beam steering capability of the backscattering radio. In some aspects, the beam information may include a mobility profile, information indicating a sequence of transmit beams, information indicating a sequence of receive beams, or a combination thereof, as described elsewhere herein.

As shown by reference number 650, in some examples, the UE may receive a signal indicating to deactivate beam tracking from the one or more nodes. For example, a node (e.g., the one or more nodes) may output the signal indicating to deactivate beam tracking. As shown by reference number 660, the UE may deactivate the beam tracking of reference number 630 in accordance with the signal. In some aspects, a node (e.g., the one or more nodes) may activate the beam tracking. For example, the node may transmit a signal indicating to activate beam tracking (e.g., in connection with the capability information indicating that the UE supports a beam tracking capability, in connection with the UE providing feedback or an indication of a motion state that facilitates beam tracking, in connection with a network-side measurement indicating that the UE can support autonomous beam tracking), and the UE may activate the beam tracking of reference number 630 in accordance with the signal. Thus, the node can switch autonomous beam tracking on or off, which enables the node to deactivate beam tracking in a situation where the node is to use a different procedure (e.g., a predefined procedure) for beam tracking of the UE.

As indicated above, FIG. 6 is provided as an example. Other examples may differ from what is described with regard to FIG. 6.

Figure 7:
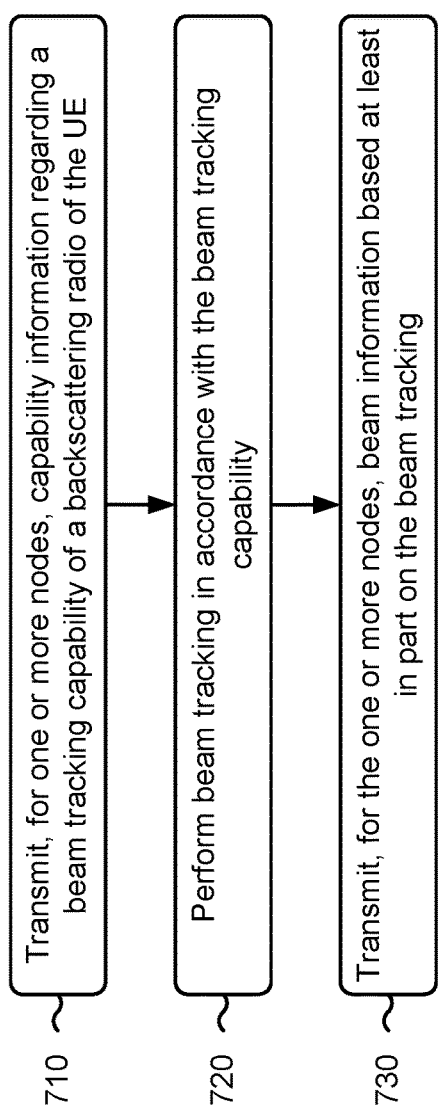
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120) performs operations associated with mobility support for a UE with a backscattering radio.

As shown in FIG. 7, in some aspects, process 700 may include transmitting, for one or more nodes, capability information regarding a beam tracking capability of a backscattering radio of the UE (block 710). For example, the UE (e.g., using communication manager 140 and/or transmission component 904, depicted in FIG. 9) may transmit, for one or more nodes, capability information regarding a beam tracking capability of a backscattering radio of the UE, as described above.

As further shown in FIG. 7, in some aspects, process 700 may include performing beam tracking in accordance with the beam tracking capability (block 720). For example, the UE (e.g., using communication manager 140 and/or beam tracking component 908, depicted in FIG. 9) may perform beam tracking in accordance with the beam tracking capability, as described above.

As further shown in FIG. 7, in some aspects, process 700 may include transmitting, for the one or more nodes, beam information based at least in part on the beam tracking (block 730). For example, the UE (e.g., using communication manager 140 and/or transmission component 904, depicted in FIG. 9) may transmit, for the one or more nodes, beam information based at least in part on the beam tracking, as described above.

Process 700 may include additional aspects, such as any single aspect or any combination of aspects described below and/or in connection with one or more other processes described elsewhere herein.

In a first aspect, the beam tracking capability of the backscattering radio is for beam tracking, using the backscattering radio, while a main radio of the UE is deactivated.

In a second aspect, alone or in combination with the first aspect, the beam tracking capability indicates whether the UE supports beam management with the one or more nodes using the backscattering radio.

In a third aspect, alone or in combination with one or more of the first and second aspects, the beam tracking capability indicates whether the UE is capable of autonomously tracking a beam using a sensor of the UE while a main radio of the UE is deactivated.

In a fourth aspect, alone or in combination with one or more of the first through third aspects, the beam tracking capability indicates a velocity threshold associated with triggering a beam training procedure.

In a fifth aspect, alone or in combination with one or more of the first through fourth aspects, process 700 includes receiving a trigger for the beam training procedure based at least in part on a velocity of the UE satisfying the velocity threshold, and performing the beam training procedure with the one or more nodes according to the trigger. By triggering the beam training procedure according to the velocity satisfying the velocity threshold, resource consumption associated with performing beam tracking at the UE using a sensor is reduced in a situation where the beam tracking at the UE is unlikely to be effective.

In a sixth aspect, alone or in combination with one or more of the first through fifth aspects, process 700 includes deactivating the beam tracking based at least in part on a signal indicating to deactivate the beam tracking.

In a seventh aspect, alone or in combination with one or more of the first through sixth aspects, transmitting the capability information further comprises transmitting the capability information prior to deactivating a main radio of the UE.

In an eighth aspect, alone or in combination with one or more of the first through seventh aspects, the one or more nodes include at least one of another UE, or a network node.

In a ninth aspect, alone or in combination with one or more of the first through eighth aspects, transmitting the capability information further comprises transmitting the capability information via a sidelink.

In a tenth aspect, alone or in combination with one or more of the first through ninth aspects, transmitting the capability information further comprises transmitting the capability information via a radio access link.

In an eleventh aspect, alone or in combination with one or more of the first through tenth aspects, the beam tracking capability indicates a beam steering capability of the backscattering radio.

In a twelfth aspect, alone or in combination with one or more of the first through eleventh aspects, the beam information indicates a preferred beam for communication with an energy transmitter. Thus, energy harvesting and communication efficiency are improved for the communication with the energy transmitter. The communication can include a data communication, a control communication, or energization by a transmission of the energy transmitter.

In a thirteenth aspect, alone or in combination with one or more of the first through twelfth aspects, process 700 includes receiving configuration information indicating a measurement threshold associated with the beam tracking, wherein performing beam tracking further comprises identifying a beam with a measurement that satisfies the measurement threshold. Thus, a node (e.g., a network node) can configure a measurement threshold for a beam, thereby ensuring satisfactory performance of a beam pair including a beam selected by the UE.

In a fourteenth aspect, alone or in combination with one or more of the first through thirteenth aspects, process 700 includes declaring beam tracking failure or initiating a beam failure recovery procedure based at least in part on the measurement failing to satisfy the measurement threshold.

In a fifteenth aspect, alone or in combination with one or more of the first through fourteenth aspects, process 700 includes triggering activation of a main radio of the UE based at least in part on the measurement failing to satisfy the measurement threshold.

In a sixteenth aspect, alone or in combination with one or more of the first through fifteenth aspects, the configuration information indicates a timer associated with the measurement failing to satisfy the measurement threshold, wherein triggering activation of the main radio further comprises triggering activation of the main radio based at least in part on an expiration of the timer.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
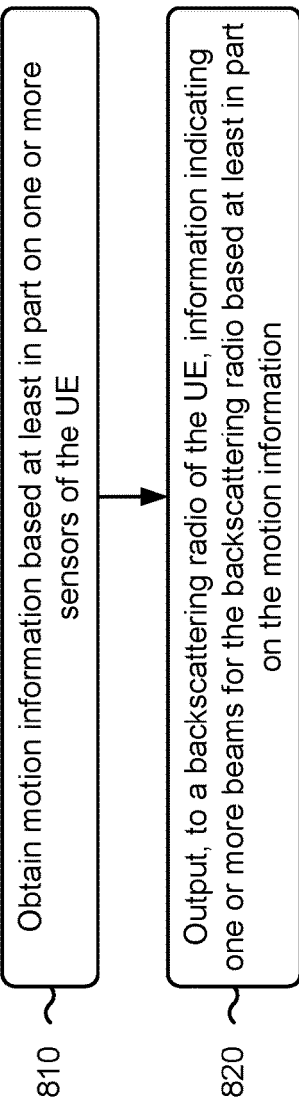
FIG. 8 is a diagram illustrating an example process performed, for example, by an apparatus of a UE, in accordance with the present disclosure.

FIG. 8 is a diagram illustrating an example process 800 performed, for example, by an apparatus of a UE, in accordance with the present disclosure. Example process 800 is an example where the apparatus (e.g., one or more processors of the UE, controller 415) performs operations associated with mobility support for a UE with a backscattering radio.

As shown in FIG. 8, in some aspects, process 800 may include obtaining motion information based at least in part on one or more sensors of the UE (block 810). For example, the apparatus (e.g., using communication manager 140 and/or motion sensing component 910, depicted in FIG. 9) may obtain motion information based at least in part on one or more sensors of the UE, as described above.

As further shown in FIG. 8, in some aspects, process 800 may include outputting, to a backscattering radio of the UE, information indicating one or more beams for the backscattering radio based at least in part on the motion information (block 820). For example, the apparatus (e.g., using communication manager 140 and/or indication component 912, depicted in FIG. 9) may output, to a backscattering radio of the UE, information indicating one or more beams for the backscattering radio based at least in part on the motion information, as described above.

Process 800 may include additional aspects, such as any single aspect or any combination of aspects described below and/or in connection with one or more other processes described elsewhere herein.

In a first aspect, process 800 includes configuring, based at least in part on feedback from the backscattering radio regarding the one or more beams, the one or more sensors to provide sensor information according to a periodicity or on demand.

In a second aspect, alone or in combination with the first aspect, the one or more beams are one or more predicted beams based at least in part on the motion information.

In a third aspect, alone or in combination with one or more of the first and second aspects, the information indicating the one or more beams is based at least in part on a beam steering capability of the backscattering radio.

In a fourth aspect, alone or in combination with one or more of the first through third aspects, the one or more beams comprise at least one of a transmit beam or a receive beam.

In a fifth aspect, alone or in combination with one or more of the first through fourth aspects, process 800 includes receiving, from the backscattering radio, measurement information regarding the one or more beams.

In a sixth aspect, alone or in combination with one or more of the first through fifth aspects, process 800 includes receiving, from the backscattering radio, information indicating an updated beam based at least in part on a beam training procedure.

In a seventh aspect, alone or in combination with one or more of the first through sixth aspects, the information indicating the updated beam indicates at least one of a single updated beam for mono-static communication, or an updated transmit beam and an updated receive beam for bi-static communication.

In an eighth aspect, alone or in combination with one or more of the first through seventh aspects, process 800 includes receiving, from the backscattering radio, a trigger to activate a main radio of the UE, and triggering activation of the main radio in accordance with the trigger.

In a ninth aspect, alone or in combination with one or more of the first through eighth aspects, the trigger is based at least in part on sensor data associated with the one or more sensors being insufficient to support mobility with the backscattering radio.

In a tenth aspect, alone or in combination with one or more of the first through ninth aspects, process 800 includes outputting, for one or more nodes, capability information regarding a beam tracking capability of the backscattering radio, and outputting, to the one or more nodes, beam information based at least in part on the beam tracking Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
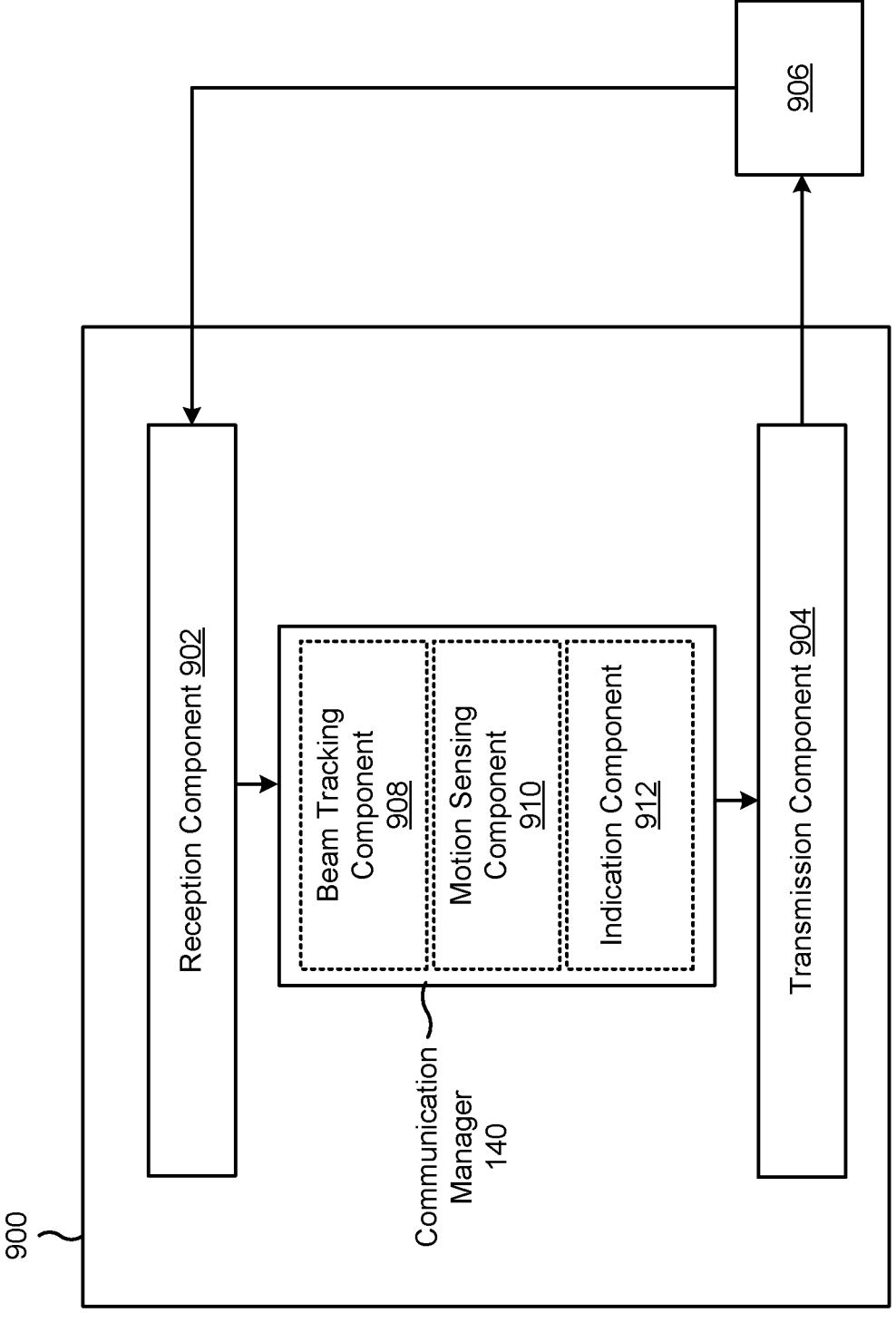
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include one or more of a beam tracking component 908, a motion sensing component 910, or an indication component 912, among other examples.

In some aspects, the apparatus 900 may be configured to perform one or more operations described herein in connection with FIGS. 4-6. Additionally, or alternatively, the apparatus 900 may be configured to perform one or more processes described herein, such as process 700 of FIG. 7, process 800 of FIG. 8, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The transmission component 904 may transmit, for one or more nodes, capability information regarding a beam tracking capability of a backscattering radio of the UE. The beam tracking component 908 may perform beam tracking in accordance with the beam tracking capability. The transmission component 904 may transmit, for the one or more nodes, beam information based at least in part on the beam tracking.

The motion sensing component 910 may obtain motion information based at least in part on one or more sensors of the apparatus 900. The indication component 912 may output, to a backscattering radio, information indicating one or more beams for the backscattering radio based at least in part on the motion information.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
FIG. 10 is a diagram illustrating an example process performed, for example, by a network node, in accordance with the present disclosure.

FIG. 10 is a diagram illustrating an example process 1000 performed, for example, by a network node, in accordance with the present disclosure. Example process 1000 is an example where the network node (e.g., network node 110) performs operations associated with mobility support for a user equipment (UE).

As shown in FIG. 10, in some aspects, process 1000 may include obtaining, from a user equipment (UE), capability information regarding a beam tracking capability for beam tracking using a backscattering radio of the UE (block 1010). For example, the network node (e.g., using communication manager 150 and/or reception component 1102, depicted in FIG. 11) may obtain, from a UE (e.g., UE 120) capability information regarding a beam tracking capability for beam tracking using a backscattering radio (e.g., backscattering radio 410) of the UE, as described above.

As further shown in FIG. 10, in some aspects, process 1000 may include obtaining, from the UE, beam information based at least in part on the beam tracking (block 1020). For example, the network node (e.g., using communication manager 150 and/or reception component 1102, depicted in FIG. 11) may obtain, from the UE, beam information based at least in part on the beam tracking, as described above.

Process 1000 may include additional aspects, such as any single aspect or any combination of aspects described below and/or in connection with one or more other processes described elsewhere herein.

In a first aspect, the beam tracking capability indicates whether the UE is capable of autonomously tracking a beam using a sensor of the UE while a main radio of the UE is deactivated.

In a second aspect, alone or in combination with the first aspect, process 1000 includes outputting (e.g., using communication manager 150 and/or configuration component 1108, depicted in FIG. 11) configuration information indicating a measurement threshold associated with the beam tracking.

Figure 11:
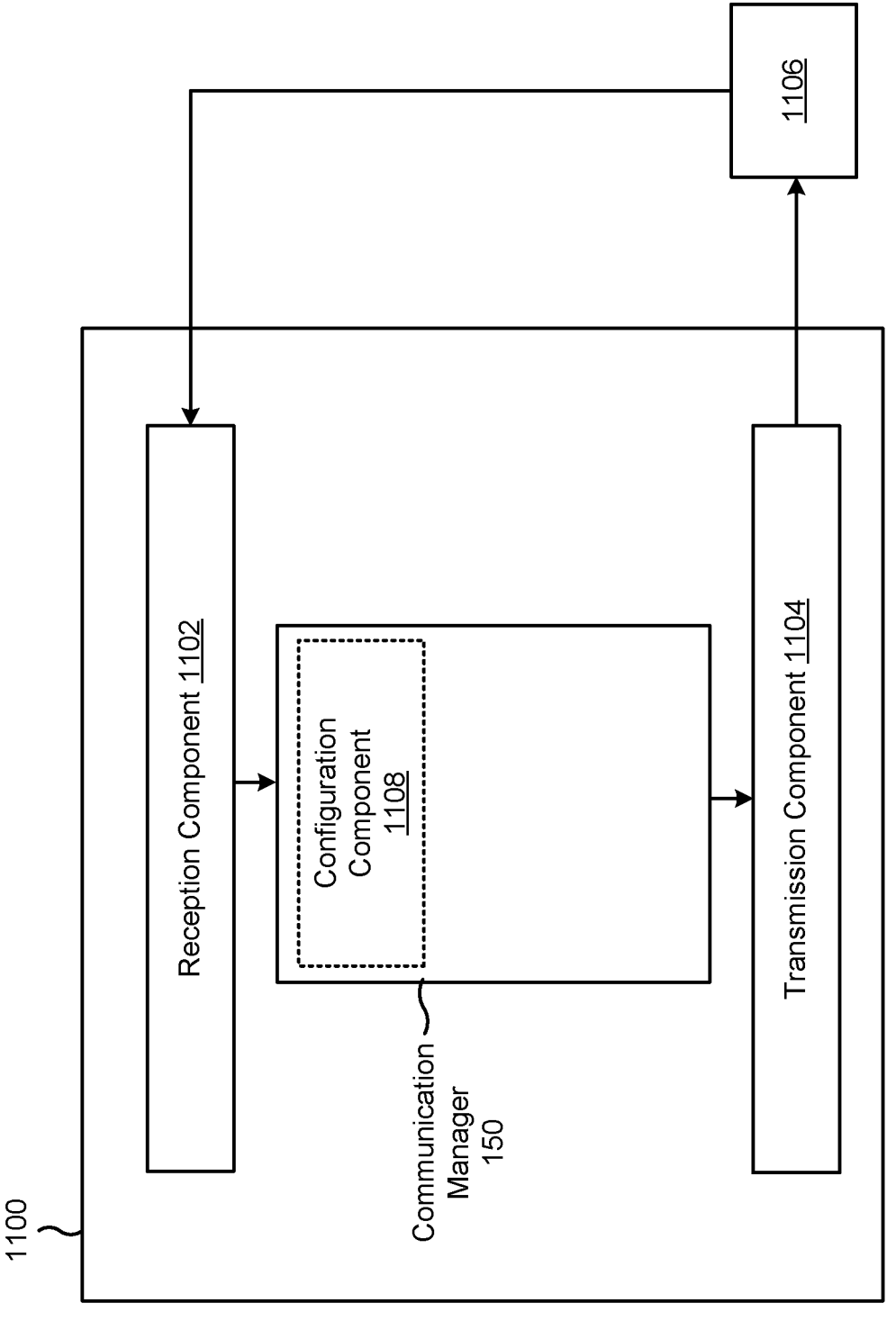
FIG. 11 is a diagram of an example apparatus for wireless communication, in accordance with the present disclosure.

In a third aspect, alone or in combination with one or more of the first and second aspects, process 1000 includes performing (e.g., using communication manager 150 and/or transmission component 1104, depicted in FIG. 11) backscatter communication with the backscattering radio based at least in part on the capability information.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include a configuration component 1108, among other examples.

In some aspects, the apparatus 1100 may be configured to perform one or more operations described herein in connection with FIGS. 4-6. Additionally, or alternatively, the apparatus 1100 may be configured to perform one or more processes described herein, such as process 1000 of FIG. 10, example 600 of FIG. 6, or a combination thereof. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver. In some aspects, the transmission component 1104 and/or the reception component 1102 may comprise or be included in a network interface via which the apparatus 1100 may perform backhaul, midhaul, or fronthaul communication with other network nodes.

The reception component 1102 may obtain, from a UE, capability information regarding a beam tracking capability of a backscattering radio of the UE. The reception component 1102 may obtain, from the UE, beam information based at least in part on the beam tracking.

The configuration component 1108 may output configuration information indicating a measurement threshold associated with the beam tracking.

The transmission component 1104 may perform backscatter communication with the backscattering radio based at least in part on the capability information.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: transmitting, for one or more nodes, capability information regarding a beam tracking capability of a backscattering radio of the UE; performing beam tracking in accordance with the beam tracking capability; and transmitting, for the one or more nodes, beam information based at least in part on the beam tracking.

Aspect 2: The method of Aspect 1, wherein the beam tracking capability of the backscattering radio is for beam tracking, using the backscattering radio, while a main radio of the UE is deactivated.

Aspect 3: The method of any of Aspects 1-2, wherein the beam tracking capability indicates whether the UE supports beam management with the one or more nodes using the backscattering radio.

Aspect 4: The method of any of Aspects 1-3, wherein the beam tracking capability indicates whether the UE is capable of autonomously tracking a beam using a sensor of the UE while a main radio of the UE is deactivated.

Aspect 5: The method of Aspect 4, wherein the beam tracking capability indicates a velocity threshold associated with triggering a beam training procedure.

Aspect 6: The method of Aspect 5, further comprising: receiving a trigger for the beam training procedure based at least in part on a velocity of the UE satisfying the velocity threshold; and performing the beam training procedure with the one or more nodes according to the trigger.

Aspect 7: The method of any of Aspects 1-6, further comprising deactivating the beam tracking based at least in part on a signal indicating to deactivate the beam tracking.

Aspect 8: The method of any of Aspects 1-7, wherein transmitting the capability information further comprises transmitting the capability information prior to deactivating a main radio of the UE.

Aspect 9: The method of any of Aspects 1-8, wherein the one or more nodes include at least one of: another UE, or a network node.

Aspect 10: The method of any of Aspects 1-9, wherein transmitting the capability information further comprises transmitting the capability information via a sidelink.

Aspect 11: The method of any of Aspects 1-10, wherein transmitting the capability information further comprises transmitting the capability information via a radio access link.

Aspect 12: The method of any of Aspects 1-11, wherein the beam tracking capability indicates a beam steering capability of the backscattering radio.

Aspect 13: The method of any of Aspects 1-12, wherein the beam information indicates a preferred beam for communication with an energy transmitter.

Aspect 14: The method of Aspect 1, further comprising: receiving configuration information indicating a measurement threshold associated with the beam tracking, wherein performing beam tracking further comprises identifying a beam with a measurement that satisfies the measurement threshold.

Aspect 15: The method of Aspect 14, further comprising declaring beam tracking failure or initiating a beam failure recovery procedure based at least in part on the measurement failing to satisfy the measurement threshold.

Aspect 16: The method of Aspect 14, further comprising triggering activation of a main radio of the UE based at least in part on the measurement failing to satisfy the measurement threshold.

Aspect 17: The method of Aspect 16, wherein the configuration information indicates a timer associated with the measurement failing to satisfy the measurement threshold, wherein triggering activation of the main radio further comprises triggering activation of the main radio based at least in part on an expiration of the timer.

Aspect 18: A method of wireless communication performed by an apparatus of a user equipment (UE), comprising: obtaining motion information based at least in part on one or more sensors of the UE; and outputting, to a backscattering radio of the UE, information indicating one or more beams for the backscattering radio based at least in part on the motion information.

Aspect 19: The method of Aspect 18, further comprising configuring, based at least in part on feedback from the backscattering radio regarding the one or more beams, the one or more sensors to provide sensor information according to a periodicity or on demand.

Aspect 20: The method of any of Aspects 18-19, wherein the one or more beams are one or more predicted beams based at least in part on the motion information.

Aspect 21: The method of any of Aspects 18-20, wherein the information indicating the one or more beams is based at least in part on a beam steering capability of the backscattering radio.

Aspect 22: The method of any of Aspects 18-21, wherein the one or more beams comprise at least one of a transmit beam or a receive beam.

Aspect 23: The method of any of Aspects 18-22, further comprising: receiving, from the backscattering radio, measurement information regarding the one or more beams.

Aspect 24: The method of any of Aspects 18-23, further comprising receiving, from the backscattering radio, information indicating an updated beam based at least in part on a beam training procedure.

Aspect 25: The method of Aspect 24, wherein the information indicating the updated beam indicates at least one of: a single updated beam for mono-static communication, or an updated transmit beam and an updated receive beam for bi-static communication.

Aspect 26: The method of any of Aspects 18-25, further comprising: receiving, from the backscattering radio, a trigger to activate a main radio of the UE; and triggering activation of the main radio in accordance with the trigger.

Aspect 27: The method of Aspect 26, wherein the trigger is based at least in part on sensor data associated with the one or more sensors being insufficient to support mobility with the backscattering radio.

Aspect 28: The method of any of Aspects 18-27, further comprising: outputting, for one or more nodes, capability information regarding a beam tracking capability of the backscattering radio; and outputting, to the one or more nodes, beam information based at least in part on the beam tracking.

Aspect 29: A method of wireless communication performed by a network node, comprising: obtaining, from a user equipment (UE), capability information regarding a beam tracking capability for beam tracking using a backscattering radio of the UE; and obtaining, from the UE, beam information based at least in part on the beam tracking.

Aspect 30: The method of Aspect 29, wherein the beam tracking capability indicates whether the UE is capable of autonomously tracking a beam using a sensor of the UE while a main radio of the UE is deactivated.

Aspect 31: The method of any of Aspects 29-30, further comprising outputting configuration information indicating a measurement threshold associated with the beam tracking.

Aspect 32: The method of any of Aspects 29-31, further comprising performing backscatter communication with the backscattering radio based at least in part on the capability information.

Aspect 33: An apparatus for wireless communication at a device, comprising a processor; memory coupled with the processor; and instructions stored in the memory and executable by the processor to cause the apparatus to perform the method of one or more of Aspects 1-32.

Aspect 34: A device for wireless communication, comprising a memory and one or more processors coupled to the memory, the one or more processors configured to perform the method of one or more of Aspects 1-32.

Aspect 35: An apparatus for wireless communication, comprising at least one means for performing the method of one or more of Aspects 1-32.

Aspect 36: A non-transitory computer-readable medium storing code for wireless communication, the code comprising instructions executable by a processor to perform the method of one or more of Aspects 1-32.

Aspect 37: A non-transitory computer-readable medium storing a set of instructions for wireless communication, the set of instructions comprising one or more instructions that, when executed by one or more processors of a device, cause the device to perform the method of one or more of Aspects 1-32.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A also may have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A user equipment (UE) for wireless communication, comprising:
one or more memories; and
one or more processors, coupled to the one or more memories, configured to:
transmit, to one or more nodes, capability information regarding a beam tracking capability of a backscattering radio of the UE, wherein the beam tracking capability indicates whether the UE is capable of autonomously tracking a beam using a sensor of the UE while a main radio of the UE is deactivated, and wherein the backscattering radio corresponds to a radio frequency identifier (RFID) transponder;
perform beam tracking using the backscattering radio in accordance with the beam tracking capability while the main radio of the UE is deactivated; and
transmit, to the one or more nodes, beam information based at least in part on the beam tracking.

2. The UE of claim 1,
wherein the beam tracking capability indicates at least one of:
a capability for beam tracking, using the backscattering radio, while a main radio of the UE is deactivated, or
whether the UE supports beam management with the one or more nodes using the backscattering radio.

3. The UE of claim 1,
wherein the beam tracking capability indicates a velocity threshold associated with triggering a beam training procedure.

4. The UE of claim 3,
wherein the one or more processors are further configured to:
perform the beam training procedure based at least in part on a velocity of the UE satisfying the velocity threshold.

5. The UE of claim 1,
wherein the one or more processors are further configured to deactivate the beam tracking based at least in part on a signal indicating to deactivate the beam tracking.

37

38

6. The UE of claim 1,
wherein the one or more processors, to transmit the capability information, are configured to transmit the capability information prior to deactivating a main radio of the UE.

7. The UE of claim 1,
wherein the one or more nodes include at least one of:
another UE, or
a network node.

8. The UE of claim 1,
wherein the one or more processors, to transmit the capability information, are configured to transmit the capability information via a sidelink.

9. The UE of claim 1,
wherein the one or more processors, to transmit the capability information, are configured to transmit the capability information via a radio access link.

10. The UE of claim 1,
wherein the beam tracking capability indicates a beam steering capability of the backscattering radio.

11. The UE of claim 1,
wherein the beam information indicates a preferred beam for communication with an energy transmitter.

12. The UE of claim 1,
wherein the one or more processors are further configured to:
receive configuration information indicating a measurement threshold associated with the beam tracking, wherein the one or more processors, to perform beam tracking, are configured to identify a beam with a measurement that satisfies the measurement threshold.

13. The UE of claim 12,
wherein the one or more processors are further configured to declare beam tracking failure or initiate a beam failure recovery procedure based at least in part on the measurement failing to satisfy the measurement threshold.

14. The UE of claim 12,
wherein the one or more processors are further configured to trigger activation of a main radio of the UE based at least in part on the measurement failing to satisfy the measurement threshold.

15. The UE of claim 14,
wherein the configuration information indicates a timer associated with the measurement failing to satisfy the measurement threshold, wherein the one or more processors, to trigger activation of the main radio, are configured to trigger activation of the main radio based at least in part on an expiration of the timer.

16. A network node for wireless communication, comprising:
one or more memories; and
one or more processors coupled to the one or more memories and configured to:
obtain, from a user equipment (UE), capability information regarding a beam tracking capability for beam tracking using a backscattering radio of the UE, wherein the beam tracking capability indicates whether the UE is capable of autonomously tracking a beam using a sensor of the UE while a main radio of the UE is deactivated, and wherein the backscattering radio corresponds to a radio frequency identifier (RFID) transponder; and
obtain, from the UE, beam information based at least in part on the beam tracking.

17. The network node of claim 16,
wherein the one or more processors are further configured to:
output configuration information indicating a measurement threshold associated with the beam tracking.

18. The network node of claim 16,
wherein the one or more processors are further configured to:
perform backscatter communication with the backscattering radio based at least in part on the capability information.

19. A method of wireless communication performed by a user equipment (UE), comprising:
transmitting, to one or more nodes, capability information regarding a beam tracking capability of a backscattering radio of the UE, wherein the beam tracking capability indicates whether the UE is capable of autonomously tracking a beam using a sensor of the UE while a main radio of the UE is deactivated, and wherein the backscattering radio corresponds to a radio frequency identifier (RFID) transponder;
performing beam tracking using the backscattering radio in accordance with the beam tracking capability while the main radio of the UE is deactivated; and
transmitting, to the one or more nodes, beam information based at least in part on the beam tracking.

20. The method of claim 19,
wherein the beam tracking capability indicates a capability for beam tracking, using the backscattering radio, while a main radio of the UE is deactivated.

21. The method of claim 19,
wherein the beam tracking capability indicates a velocity threshold associated with triggering a beam training procedure.

22. The method of claim 21, further comprising:
performing the beam training procedure based at least in part on a velocity of the UE satisfying the velocity threshold.

23. The method of claim 19, further comprising:
deactivating the beam tracking based at least in part on a signal indicating to deactivate the beam tracking.

24. The method of claim 19, further comprising:
transmitting the capability information prior to deactivating a main radio of the UE.

25. The method of claim 19, further comprising:
transmitting the capability information via a sidelink.

26. The method of claim 19,
wherein the beam tracking capability indicates a beam steering capability of the backscattering radio.

27. The method of claim 19,
wherein the beam information indicates a preferred beam for communication with an energy transmitter.

28. A method of wireless communication performed by a network node, comprising:
obtaining, from a user equipment (UE), capability information regarding a beam tracking capability for beam tracking using a backscattering radio of the UE, wherein the beam tracking capability indicates whether the UE is capable of autonomously tracking a beam using a sensor of the UE while a main radio of the UE is deactivated, and wherein the backscattering radio corresponds to a radio frequency identifier (RFID) transponder; and
obtaining, from the UE, beam information based at least in part on the beam tracking.

29. The method of claim 28, further comprising:

outputting configuration information indicating a measurement threshold associated with the beam tracking.

30. The method of claim 28, further comprising:

performing backscatter communication with the backscattering radio based at least in part on the capability information.

* * * * *